(12) United States Patent
Baldys et al.

(10) Patent No.: US 10,521,975 B2
(45) Date of Patent: Dec. 31, 2019

(54) METHOD AND SYSTEM FOR GENERATING A SERVICE INDICATOR

(71) Applicant: HYVA HOLDING B.V., Alphen aan den Rijn (NL)

(72) Inventors: Marek Baldys, Amsterdam (NL); Maarten Hertog, Utrecht (NL); Jacob Biemond, Bodegraven (NL)

(73) Assignee: HYVA HOLDING B.V. (NL)

( * ) Notice: Subject to any disclaimer, the term of this patent is extended or adjusted under 35 U.S.C. 154(b) by 85 days.

(21) Appl. No.: 15/556,026

(22) PCT Filed: Feb. 26, 2016

(86) PCT No.: PCT/EP2016/054174
§ 371 (c)(1),
(2) Date: Sep. 6, 2017

(87) PCT Pub. No.: WO2016/142195
PCT Pub. Date: Sep. 15, 2016

(65) Prior Publication Data
US 2018/0276902 A1  Sep. 27, 2018

(30) Foreign Application Priority Data
Mar. 6, 2015  (GB) .................................. 1503870.6

(51) Int. Cl.
*G07C 5/00* (2006.01)
*B60P 1/28* (2006.01)
(Continued)

(52) U.S. Cl.
CPC ................ *G07C 5/006* (2013.01); *B60P 1/16* (2013.01); *B60P 1/283* (2013.01); *F15B 19/005* (2013.01); *G07C 5/10* (2013.01)

(58) Field of Classification Search
CPC ......... G07C 5/006; G07C 5/10; F15B 10/005; B60P 1/16; B60P 1/283; B60P 1/165
See application file for complete search history.

(56) References Cited

U.S. PATENT DOCUMENTS 5,446,672 A   8/1995  Boldys
6,263,039 B1  7/2001  Ducharme
(Continued)

FOREIGN PATENT DOCUMENTS

AU   200910034 A4    2/2009
WO   2006093438 A1   9/2006

OTHER PUBLICATIONS

Search Report and Written Opinion for application No. PCT/EP2016/054174 filed Feb. 26, 2016 (7 pages).

*Primary Examiner* — Michael J Zanelli

(57) ABSTRACT

There is disclosed a method of generating a service indicator for a tipper, the tipper comprising a tipper body pivotably moveable with respect to a frame with a hydraulic cylinder disposed therebetween and actuatable to pivot the tipper body to perform a tipping cycle. The method comprises monitoring at least one parameter relating to the movement of the tipper body with respect to the frame; identifying when a tipping cycle is performed based on the at least one monitored parameter; counting the number of tipping cycles performed; determining whether the number of tipping cycles performed has reached a service threshold; and generating a service indicator when it is determined that the service threshold has been reached.

16 Claims, 7 Drawing Sheets

(51) Int. Cl.
    *G07C 5/10*     (2006.01)
    *B60P 1/16*     (2006.01)
    *F15B 19/00*     (2006.01)

(56) References Cited

U.S. PATENT DOCUMENTS

| | | | |
|---|---|---|---|
| 9,242,589 B2 * | 1/2016 | Itai | B60P 1/283 |
| 2006/0104404 A1 * | 5/2006 | Blackburn | G07C 5/085 |
| | | | 377/27 |
| 2009/0240402 A1 | 9/2009 | Lugash et al. | |
| 2012/0201640 A1 * | 8/2012 | Jessen | E02F 3/434 |
| | | | 414/694 |
| 2018/0056841 A1 * | 3/2018 | Baldys | B60P 1/045 |

\* cited by examiner

METHOD AND SYSTEM FOR GENERATING A SERVICE INDICATOR

FIELD

The invention relates to a method and system for generating a service indicator for a tipper based on the number of tipping cycles performed.

BACKGROUND

A tipper truck, sometimes referred to as a dump or dumper truck, is a vehicle that is typically used in the construction industry for transporting aggregate (e.g. gravel or sand). The tipper typically comprises an engine, a driver cab and a trailer. The trailer usually has a trailer chassis or frame with a tipper body, in the form of an open-top cuboidal container, pivotably mounted thereto. A hydraulic cylinder is provided between the frame and the tipper body and can be extended to pivot the tipper body to a tipping position in which the load is emptied from the body. The cylinder can be retracted to lower the tipper body. It should be appreciated that this is merely one form of tipper truck and other types do exist.

In order to ensure a smooth operation of the tipper it is important to service it regularly. For example, it is important to regularly grease various pivot axles and bearings such as those for the tipper body and the hydraulic cylinder. However, there may be a tendency to neglect to service a tipper vehicle which can have a negative effect on the operation and/or life of the vehicle.

SUMMARY

It is therefore desirable to provide a method and system which addresses this problem to at least some extent.

According to an aspect there is provided a method of generating a service indicator for a tipper, the tipper comprising a tipper body pivotably moveable with respect to a frame with a hydraulic cylinder disposed therebetween and actuatable to pivot the tipper body to perform a tipping cycle, the method comprising: monitoring at least one parameter relating to the movement of the tipper body with respect to the frame; identifying when a tipping cycle is performed based on the at least one monitored parameter; counting the number of tipping cycles performed; determining whether the number of tipping cycles performed has reached a service threshold; and generating a service indicator when it is determined that the service threshold has been reached. The method may help to ensure that the tipper is properly serviced and therefore the life of the tipper may be extended.

An angular positional parameter relating to the tip angle of the tipper body may be monitored. The term "angular positional parameter" covers any measurable parameter from which the angular position and/or tip angle of the tipper body can be determined. Thus the angular positional parameter does not have to be generated by directly measuring the angular position of the tipper body. For example, the angular positional parameter could be generated by measuring another factor such as the inclination angle of the hydraulic cylinder, the length of the hydraulic cylinder, or the vertical distance between the frame and the lower surface of the tipper body.

The angular positional parameter may be generated by an inclination sensor. The inclination sensor may measure the inclination of the hydraulic cylinder. The inclination sensor may be mounted to the hydraulic cylinder. The inclination sensor may measure the inclination of the hydraulic cylinder in a plane perpendicular to the pivot axis of the cylinder (i.e. the fore-aft inclination). The inclination sensor may measure the inclination of the tipper body. The inclination sensor may be mounted to the tipper body. The angular positional parameter may be generated by a rotary position sensor. The rotary position sensor may measure the angular position of the hydraulic cylinder about a pivot axis of the hydraulic cylinder. The rotary position sensor may measure the angular position of the tipper body about the pivot axis of the hydraulic cylinder. The position sensor, such an inclination (or tilt) sensor or a rotary position sensor, may be electronic and may be arranged to generate an electronic signal, the value of which is related to the angular position of the tipper body.

A pressure parameter relating to the hydraulic pressure within the hydraulic cylinder may be monitored. The term "pressure parameter" covers any measurable parameter from which the pressure of the hydraulic fluid within the hydraulic cylinder can be determined. The pressure parameter may be generated by a pressure sensor which measures the hydraulic pressure within the hydraulic cylinder. The pressure sensor may be mounted to the hydraulic cylinder. The pressure sensor could be mounted within a port provided in the hydraulic cylinder. In other embodiments the pressure sensor may be provided within a fluid line connected to the hydraulic cylinder. The pressure sensor could be an electronic pressure arranged to generate an electronic pressure signal, the value of which is related to the hydraulic pressure within the hydraulic cylinder.

A tipping cycle may be identified when the monitored parameter crosses at least one threshold. For example, each time the inclination of the cylinder crosses a particular angular position, or each time the inclination of the tipper body crosses a particular angular position, or each time the pressure in the cylinder rises above a threshold a tipping cycle may be identified. A tipping cycle may be identified when the monitored parameter crosses at least an upper threshold and a lower threshold. For example, each time the inclination of the cylinder or tipper body crosses a lower threshold and an upper threshold a tipping cycle may be identified.

A tipping cycle may be identified based on two or more parameters, such as a monitored pressure parameter and a monitored angular positional parameter. A tipping cycle may be identified only if the pressure parameter satisfies a first criteria, and if the angular positional parameter satisfies a second criteria. This may improve the reliability of identifying a tipping cycle.

A tipping cycle counter may be incremented each time a tipping cycle is identified. It may be possible to reset the tipping cycle counter, for example after the tipper is serviced, the tipping cycle counter could be reset to zero.

Determining whether the number of tipping cycles performed has reached a service threshold comprises comparing the number of tipping cycles performed with a service threshold number of cycles.

Generating a service indicator may comprise generating a visual and/or an audible alert.

The method may further comprise displaying the number of tipping cycles counted.

According to another aspect there is provided a system for generating a service indicator for a tipper, the tipper comprising a tipper body pivotably moveable with respect to a frame with a hydraulic cylinder disposed therebetween and actuatable to pivot the tipper body to perform a tipping cycle, the system comprising: a tipping cycle identification module arranged to: monitor at least one parameter relating to the movement of the tipper body with respect to the frame; and identify when a tipping cycle is performed based on the at least one monitored parameter; a tipping cycle counter arranged to count the number of tipping cycles performed; a service determination module arranged to determine whether the number of tipping cycles performed has reached a service threshold; and a service indicator generator arranged to generate a service indicator when it is determined that the service threshold has been reached.

The tipping cycle identification module may be arranged to monitor an angular positional parameter relating to the tip angle of the tipper body. The system may further comprise an inclination sensor arranged to generate the angular positional parameter. The inclination sensor may be arranged to measure the inclination of the hydraulic cylinder. The inclination sensor may be arranged to measure the inclination of the tipper body. The system may further comprise a rotary position sensor arranged to generate the angular positional parameter. The rotary position sensor may be arranged to measure the angular position of the hydraulic cylinder about a pivot axis of the hydraulic cylinder.

The rotary position sensor may be arranged to measure the angular position of the tipper body about the pivot axis of the hydraulic cylinder.

The tipping cycle identification module may be arranged to monitor a pressure parameter relating to the hydraulic pressure within the hydraulic cylinder. The system may further comprise a pressure sensor arranged to measure the hydraulic pressure within the hydraulic cylinder and generate the pressure parameter.

The tipping cycle identification module may be arranged to identify a tipping cycle when the monitored parameter crosses at least one threshold. The tipping cycle identification module may be arranged to identify a tipping cycle when the monitored parameter crosses at least an upper threshold and a lower threshold.

The tipping cycle counter may be arranged to be incremented each time a tipping cycle is identified by the tipping cycle identification module.

The system may further comprise a storage module storing a service threshold number of tipping cycles. The service determination module may be arranged to determine whether the number of tipping cycles performed has reached a service threshold by comparing the number of tipping cycles performed with the service threshold number of cycles stored in the storage module.

The service indicator generator may comprise a visual and/or an audible alert generator. The system may further comprise a display arranged to display the number of tipping cycles counted.

According to a further aspect there is provided a tipper comprising: a tipper body pivotably moveable with respect to a frame; a hydraulic cylinder disposed between the frame and the tipper body and actuatable to pivot the tipper body; and a system in accordance with any statement herein. The inclination sensor may be mounted to the hydraulic cylinder. The inclination sensor may be mounted to the tipper body. The pressure sensor may be mounted to the hydraulic cylinder. The tipper may be a tipper vehicle.

According to yet a further aspect there is provided a hydraulic cylinder assembly comprising: a hydraulic cylinder having at least one pivot axis perpendicular to the longitudinal axis of the cylinder; and at least one inclination sensor coupled to the hydraulic cylinder such that it is capable of generating a fore-aft inclination parameter relating to the inclination of the cylinder in a plane perpendicular to the pivot axis. At least one end of the hydraulic cylinder may be provided with an eye which defines the pivot axis.

The invention may comprise any combination of the features and/or limitations referred to herein, except combinations of such features as are mutually exclusive.

BRIEF DESCRIPTION OF THE FIGURES

Embodiments of the invention will now be described, by way of example, with reference to the accompanying drawings, in which.

DETAILED DESCRIPTION

Figure 1:
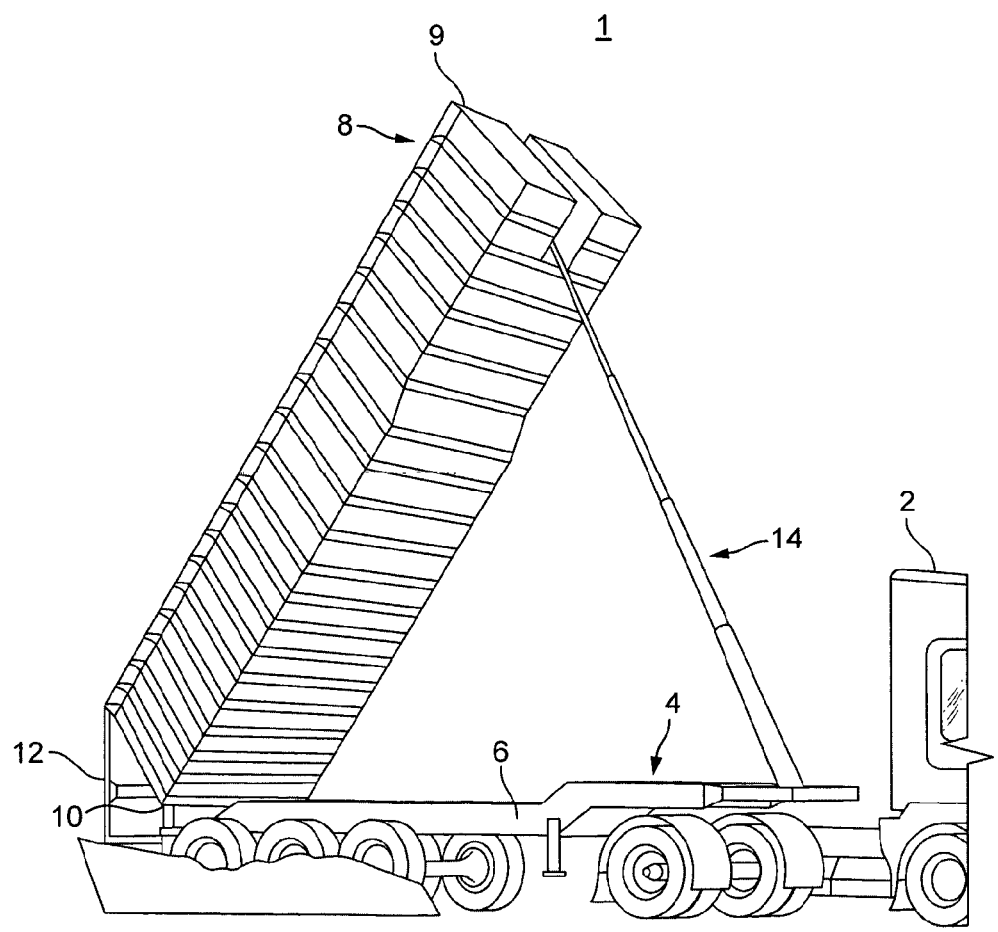
FIG. 1 schematically shows a perspective view of a tipper truck.
Figure 2:
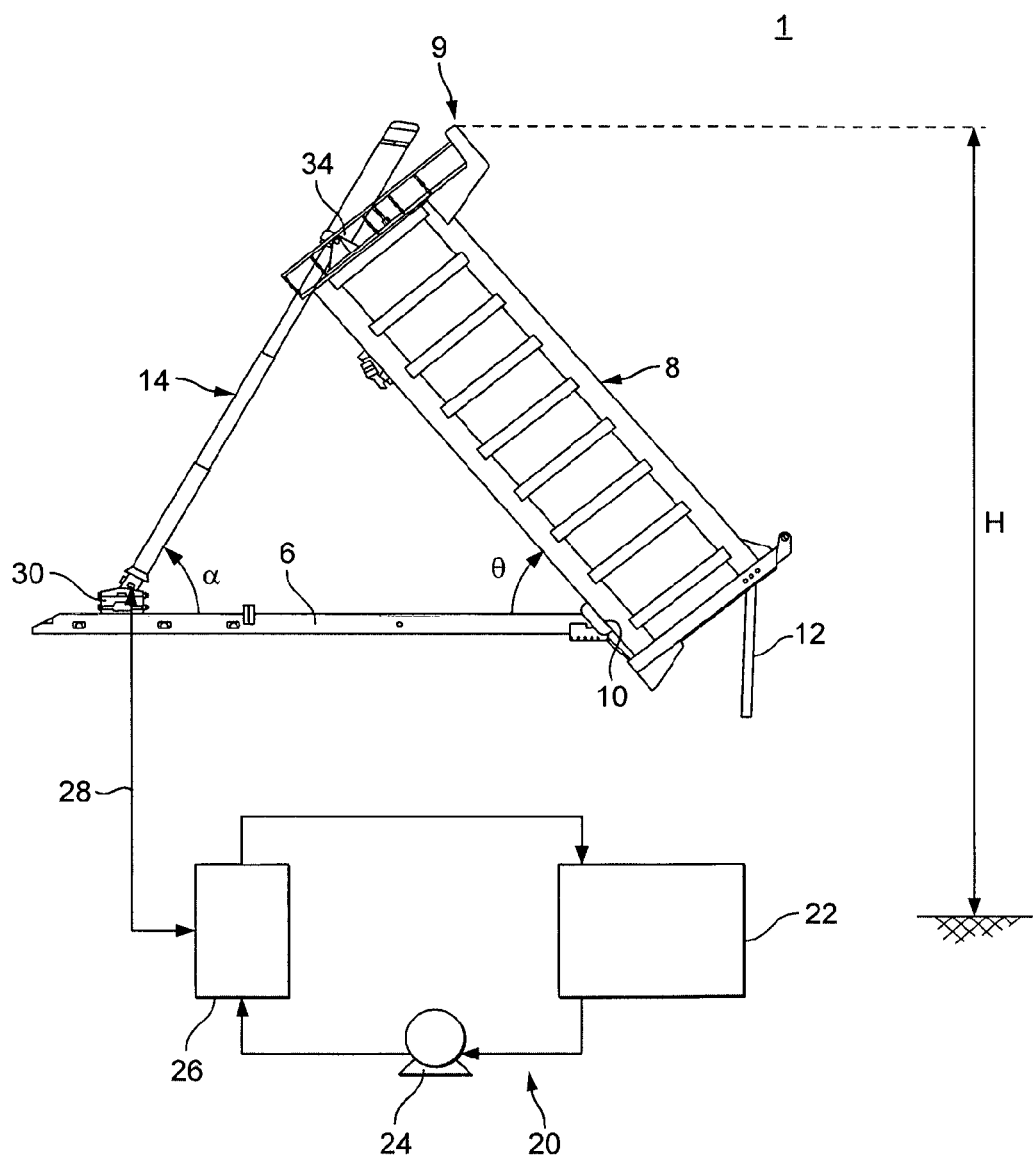
FIG. 2 schematically shows a side view of the tipper truck of FIG. 1 without the tractor.

FIGS. 1 and 2 show a tipper truck 1, sometimes referred to as a dump truck, comprising a tractor 2 and a trailer 4. The trailer 4 has a trailer chassis or frame 6, and a tipper body 8 is pivotably mounted thereto. The tipper body 8 is pivotably mounted to the chassis 6 about a transverse axis 10 that is located at the rear of the chassis 6. The tipper body 8 is in the form of a cuboidal container having an open top. The rear panel (or door) 12 of the tipper body 8 is hinged at its upper edge and can be locked and unlocked such that it can be opened to allow the contents of the tipper body 8 to be emptied. A hydraulic cylinder 14 is provided that is pivotably attached at a lower end to the front of the chassis 6 and pivotably attached an upper end to the front of the tipper body 8. The hydraulic cylinder 14 can be extended (as in FIG. 1) to pivot the tipper body 8 about the axis 10 to a fully tipped position in which, with the rear panel 12 unlocked, any load within the tipper body 8 is emptied onto the ground. The tipper body 8 can be lowered back to the resting position under its own weight, thereby causing the cylinder 14 to retract. Since the lower end of the hydraulic cylinder 14 is pivotably fixed to the chassis 6 and the upper end of the hydraulic cylinder 14 is pivotably fixed to the tipper body 8, there is a fixed relationship between the inclination angle α of the cylinder 14 relative to the chassis, and the tip angle θ of the tipper body 8 relative to the chassis 6. The various pivot axes (rear pivot axis 10 of the tipper body 8, and the upper and lower pivot axes of the hydraulic cylinder) comprise greased bearings which must be maintained to ensure smooth operation of the tipper.

The tipper truck 1 further comprises a hydraulic actuation system 20 for actuating the hydraulic cylinder 14. The hydraulic actuation system 20 comprises an oil tank 22, a pump 24 and a valve assembly 26 that are connected with fluid lines to form a fluid circuit. A pilot system (not shown) is also provided for switching the valve assembly 26 between various configurations. The valve assembly 26 is provided with a port that is hydraulically connected to the hydraulic cylinder 14 with a fluid line 28. The valve assembly 26 can be switched between a number of configurations in order to operate the hydraulic cylinder 14. In a bypass configuration of the valve assembly 26, with the pump 24 running, hydraulic fluid is circulated by the pump 24 from the tank 22, through the valve assembly 26 back to the tank 22. In order to extend the hydraulic cylinder 14 to pivot the tipper body 8 to a fully tipped position (as in FIGS. 1 and 2), the valve assembly 26 is switched to a raising configuration in which the pump 24 pumps hydraulic fluid from the tank 22 into the hydraulic cylinder 14, thus causing it to extend. When the hydraulic cylinder 14 has been sufficiently extended (either fully extended or extended by the desired amount), the valve assembly 26 is returned to a bypass configuration in which, with the pump 24 running, hydraulic fluid is circulated from the tank 22 through the valve assembly 26 back to the tank 22. In the bypass configuration of the valve assembly 26 the fluid line 28 is closed and therefore the cylinder 14 remains in the extended configuration. In this embodiment, the hydraulic actuation system 20 is provided with an automatic knock-off which automatically switches the valve assembly 26 to the bypass configuration when the hydraulic cylinder has been fully extended. The automatic knock-off is in the form of a switch which the body of the hydraulic cylinder 14 triggers when it reaches the fully extended position. The valve assembly 26 is also provided with a pressure relief bypass valve. If the pressure of the hydraulic fluid in the valve assembly 26 has reached a threshold (which may be due to an excessively heavy load in the tipper body 8) the hydraulic fluid is diverted to the tank 22, rather than being pumped into the hydraulic cylinder 14. This is a safety feature provided to prevent excessively heavy loads from being lifted. In order to lower the hydraulic cylinder 14, the pump 24 is shut off and the valve assembly 26 is switched to a lowering configuration. In this configuration, the fluid line 28 is opened and the cylinder 14 retracts under the weight of the tipper body 8 with the hydraulic fluid being returned to the tank 22.

As will be described in detail below, the tipper truck 1 is provided with a service indicator system 40 which is configured to monitor the operation of the tipper truck 1 and generate a service indicator alert to indicate that it is necessary to service the tipper 1.

Figure 3:
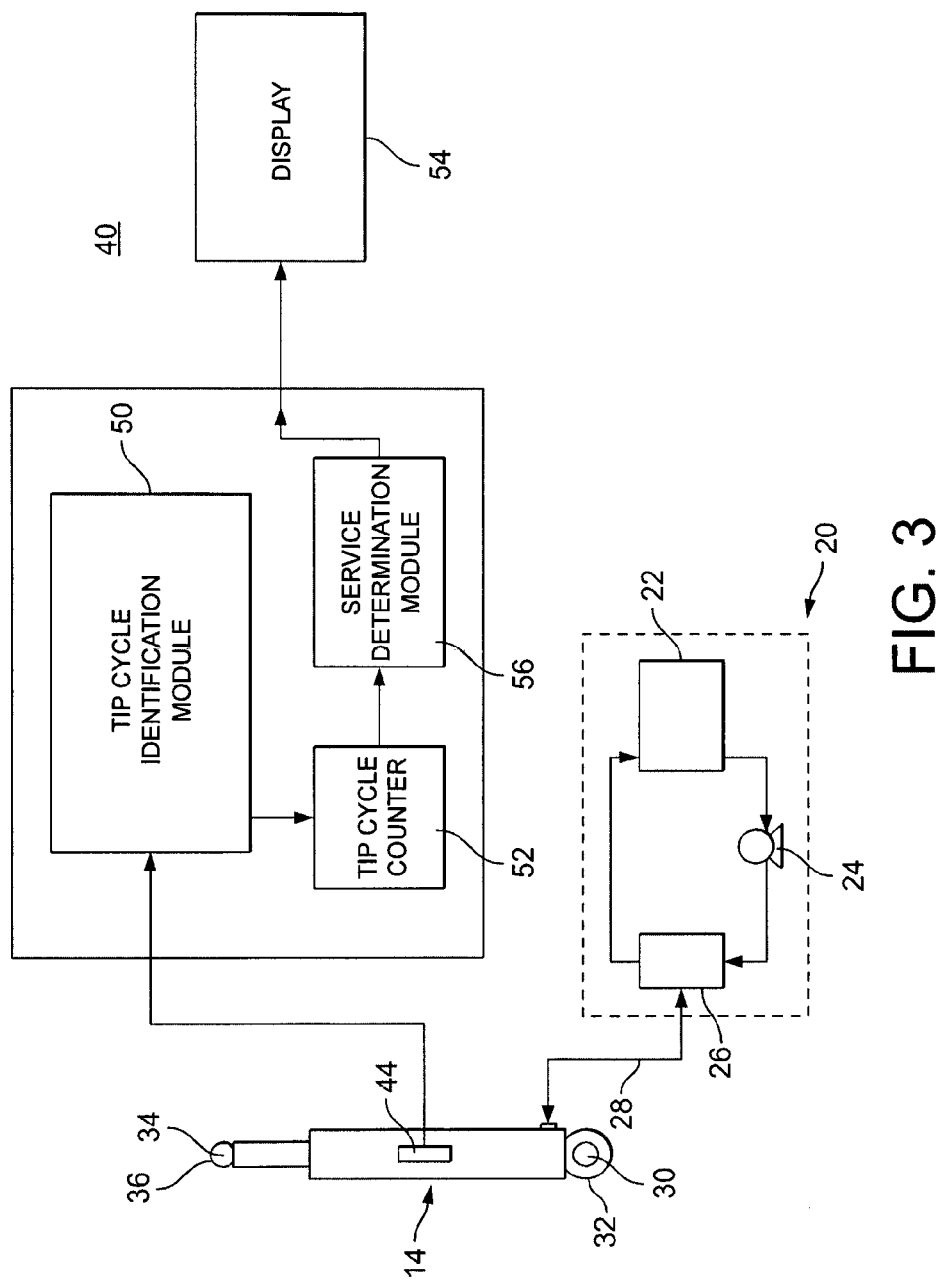
FIG. 3 schematically shows a service indicator system.

FIG. 3 shows the service indicator system 40 for generating a service indicator alert. The service indicator system 40 comprises an inclination (or tilt) sensor 44 for measuring the inclination (i.e. the tilt angle) of the hydraulic cylinder 14 in a plane perpendicular to the lower pivot axis 30. The lower pivot axis 30 of the cylinder 14 is defined by the axis of the eye 32 by which the cylinder 14 is pivotably mounted to the chassis 6. Similarly, the upper pivot axis 34 (which is parallel to the lower axis 30) is defined by the axis of the eye 36 by which the cylinder 14 is pivotably mounted to the tipper body 8. The inclination sensor 44 is mounted to the outer surface of the hydraulic cylinder 14 and is positioned such that it can measure the fore-aft (i.e. forwards/backwards) inclination of the hydraulic cylinder 14 in a plane perpendicular to the pivot axis 30. The inclination sensor 44 is arranged to generate an electronic signal which is representative of the inclination angle α. In this embodiment, with the truck chassis 6 horizontal, the inclination angle α of the hydraulic cylinder 14 can be determined from the electronic signal generated by the inclination sensor 44. Due to the fixed relationship between the inclination angle and the tip angle, the electronic signal generated by the inclination sensor 44 also relates to the tip angle θ (i.e. with the truck chassis 6 horizontal the tip angle θ can be determined from the electronic signal generated by the inclination sensor).

The service indicator system 40 further comprises a tipping cycle identification module 50, a tipping cycle counter 52, a service determination module 56 and a touch-screen display 54. The inclination sensor 44 is connected to the tipping cycle identification module 50 by appropriate cabling such that the tipping cycle identification module 50 can obtain the signals generated by the inclination sensor 44. It should be appreciated that in other embodiments the inclination sensor 44 could be wirelessly connected to the tipping cycle identification module 50. The tipping cycle identification module 50 is configured to monitor the signal generated by the inclination sensor 44 during operation of the tipper 1 and to identify each tipping cycle performed by the tipper 1 from the monitored signal. In this embodiment, a single tipping cycle is defined as the pivoting movement of the tipper body 8 from a resting position, to a tipping position (which may be the fully tipped position), and back to a resting position. The tipping cycle identification module 50 is configured to analyse the inclination signal (angular positional parameter) and utilises a tipping cycle identification algorithm to identify a tipping cycle. The identification of a tipping cycle will be explained in more detail below. The tipping cycle counter 52 is connected to the tipping cycle identification module 50 and counts the number of tipping cycles identified by the tipping cycle identification module 50 (and therefore performed by the tipper 1). The service determination module 56 is configured to determine whether the number of tipping cycles counted has reached a threshold number of tipping cycles (i.e. the number of cycles performed before the tipper 1 should be serviced). When the threshold is reached, the service determination module 56 generates an output to the display 54, such as an LCD screen, causing it to display a visual alert. In this embodiment a sounder is also provided to generate an audible alert. The visual alert could inform the operator what action should be taken (for example, it could instruct the operator to grease the bearings/pivot axes) or it could simply indicate that general maintenance should be performed. In this embodiment the display 54 is installed in the dashboard of the tractor 2 such that it is easily visible by an operator. However, in other embodiments it could be located externally, or it could be in the form of a wireless hand-held device (e.g. a smartphone or a tablet). If the display 54 is provided by a portable wireless device, such as a smartphone or tablet, it could also incorporate the tipping cycle identification module 50 and the tipping cycle counter 52 and could communicate wirelessly with the inclination sensor 44. It should be appreciated that other displays, such as a coloured light, could be used to indicate that servicing is required.

Figure 4:
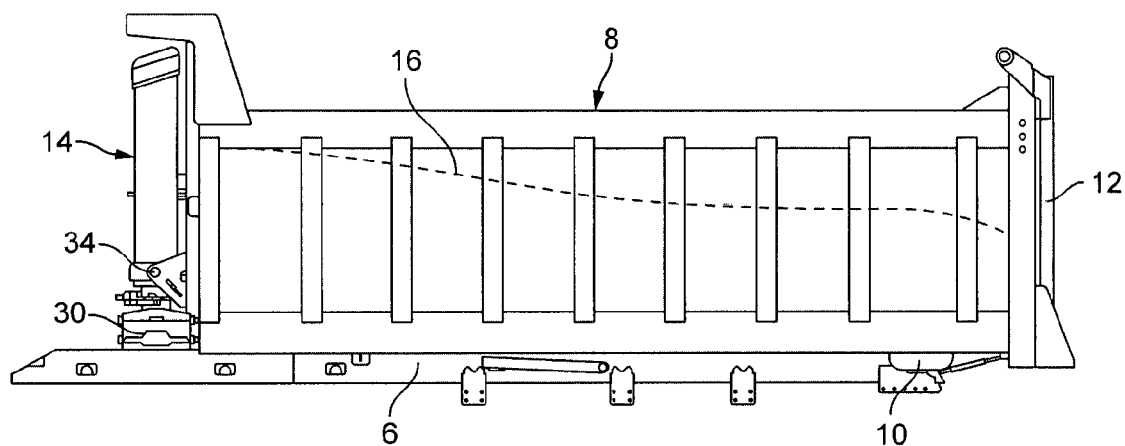
FIG. 4 schematically shows a tipper truck with the tipper body in a resting position.
Figure 5:
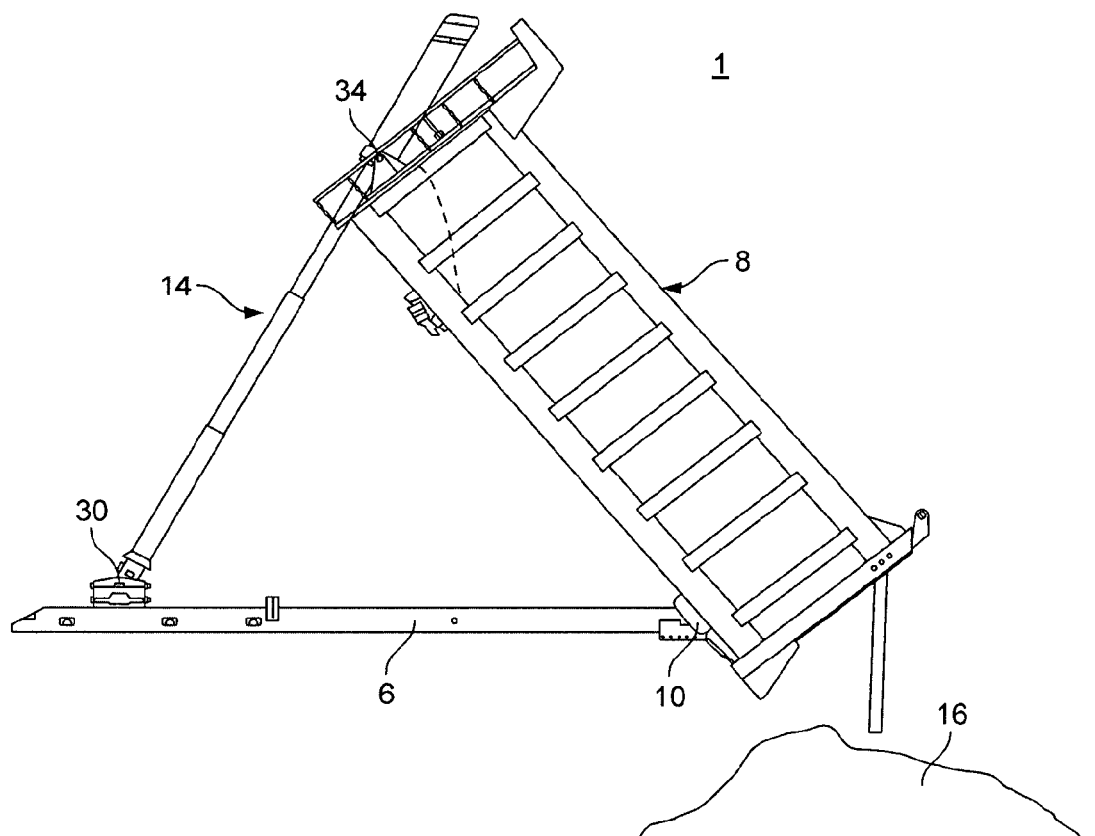
FIG. 5 schematically shows a tipper truck with the tipper body in a fully tipped position.

The operation of the tipper will now be described with reference to FIGS. 4 and 5.

A tipper truck 1 will typically perform a large number of tipping operations before it must be serviced. Before commencing a particular tipping operation the tipper truck 1 is driven to a location where the chassis 6 is substantially horizontal. Initially, the tipper body 8 containing a load 16 (such as sand) is in a resting position (FIG. 4). In the resting position of the tipper body 8 it rests on the chassis 6 of the trailer 4 such that the load is transferred directly to the chassis 6. In order to commence a tipping operation in which the load 16 within the tipper body 8 is progressively emptied, an operator uses a control lever (not shown) of the hydraulic actuation system 20 to extend the hydraulic cylinder 14. This causes the tipper body 8 to be pivoted about the axis 10 from the resting position towards a fully tipped position (FIG. 5). Since the rear door 12 is unlocked during the tipping operation, as the hydraulic cylinder 14 is extended, the load 16 is emptied onto the ground. Once the load has been emptied, the tipper body 8 is returned to the resting position under its own weight, thus causing the hydraulic cylinder to be retracted.

During the operation of the tipper 1 the tipping cycle identification module 50 continuously monitors the value of the inclination signal generated by the inclination sensor 44 (angular positional parameter). During the movement of the tipper body 8 from the resting position (FIG. 4) to the fully tipped position (FIG. 5) the inclination angle α of the cylinder reduces from approximately 90° (at the resting position) to approximately 65° (at the fully tipped position). Similarly, during the movement of the tipper body 8 from the fully tipped position to the resting position the inclination angle α of the cylinder increases from approximately 65° (at the resting position) to approximately 90° (at the fully tipped position). The inclination sensor 44 generates a signal indicative of this variation in inclination angle α. As explained below with reference to FIG. 6, the tipping cycle identification module 50 employs an identification algorithm to identify each tip cycle from the electronic signal generated by the inclination sensor 44.

Figure 6:
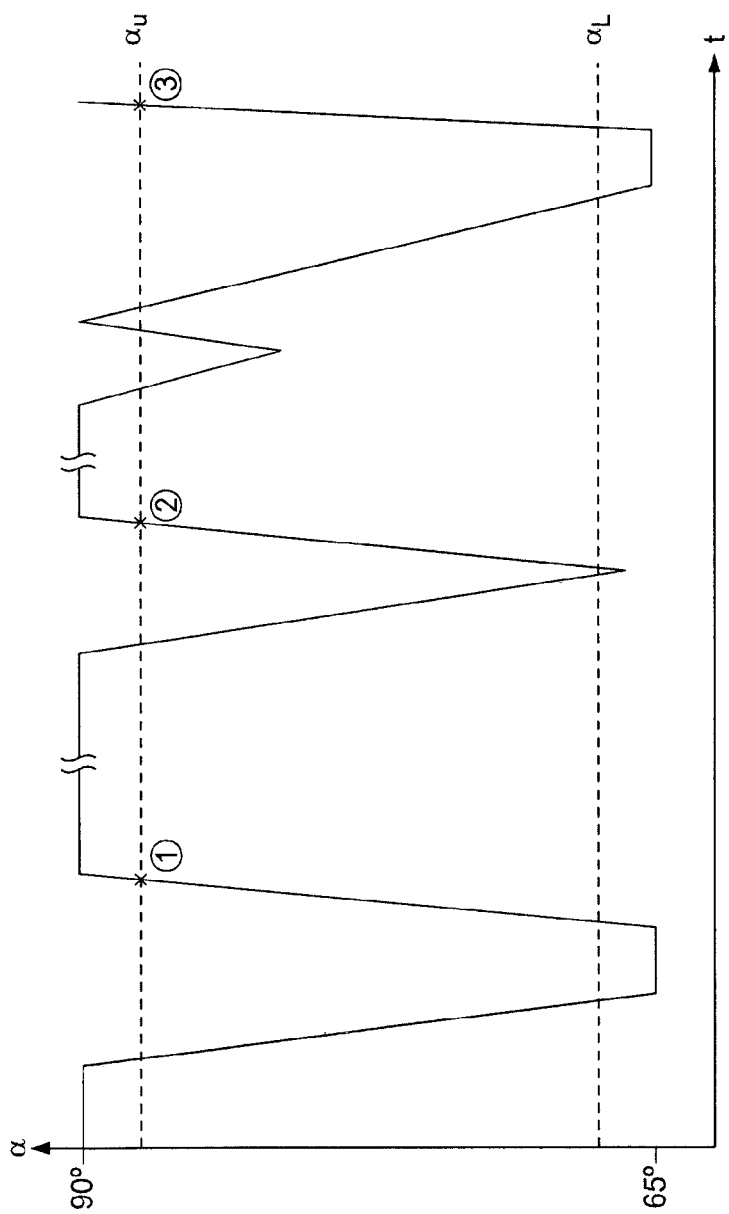
FIG. 6 schematically shows a graphical representation of the signal generated by the inclination sensor of the service indicator system.

FIG. 6 is a graphical representation of the output of the inclination signal (i.e. the angular positional parameter converted to an inclination angle α) generated by the inclination sensor 44. In order to be able to identify a tipping cycle, in this embodiment an upper threshold $α_U$ which equates to an inclination angle of 85°, and a lower threshold $α_L$ which equates to an inclination angle of 70° are defined. The tipping cycle identification module 50 is configured such that it identifies (or counts) a tipping cycle when the inclination signal sequentially falls below the upper threshold $α_U$, falls below the lower threshold $α_L$, rises about the lower threshold $α_L$, and rises above the upper threshold $α_U$. This corresponds to the tipper body 8 being pivoted away from the resting position towards the fully tipped position, and then returned to the resting position. As can be seen, FIG. 6 shows a time period in which three tipping cycles are identified. It should be appreciated that other algorithms could be used to identify tipping cycles. For example, a tipping cycle could be identified as soon as the inclination angle falls below a particular threshold (such as the upper threshold $α_U$ or lower threshold $α_L$), or as soon as the inclination angle rises above a particular threshold (such as the upper threshold $α_U$ or lower threshold $α_L$). Further, although the thresholds have been described in terms of angles, the direct output of the inclination sensor (which could be a voltage) could be monitored with respect to voltage thresholds. Of course, any suitable threshold values could be used in order to accurately identify tipping cycles.

Each time a tipping cycle is identified by the tipping cycle identification module 50, the tipping cycle counter 52 is incremented by one. The service determination module 56 then checks whether the total number of tipping cycles counted C has reached a threshold service level of tipping cycles $C_T$. In this embodiment, the threshold number of cycles is 1000. The threshold number of tipping cycles $C_T$ corresponds to the number of tipping cycles that can be performed before a particular maintenance task (such as greasing/oiling the pivot axes) must be performed. When the number of tipping cycles counted C has reached the threshold $C_T$, the service determination module 56 communicates with the display 54 to generate a visual and an audible alert to the operator. The visual alert instructs the operator to perform a specific maintenance task. Once this maintenance task has been performed, the tip cycle counter 52 can be reset to zero.

The tipping cycle identification module 50 may make various assumptions in order to be able to identify tipping cycles. For example, the tipping cycle identification module 50 may assume that the chassis 6 is horizontal. If the chassis 6 is not horizontal, the service indicator system 40 may be able to determine the inclination angle of the chassis 6, and may use this value to correct for any inclination. For example, the chassis 6 may be provided with an inclination sensor arranged to generate a signal indicative of the inclination angle. In other arrangements, the signal generated by the inclination sensor 44 attached to the hydraulic cylinder 14 may be used to determine the inclination angle of the chassis 6. For example, with the tipper body 8 in the resting position (FIG. 4), the signal generated by the inclination sensor 44 may be used to calculate the inclination angle of the chassis 6 based on the known inclination angle of the hydraulic cylinder 14 with the chassis 6 horizontal.

It has been described above that the angular positional parameter is generated by an inclination sensor attached to the hydraulic cylinder 14. However, other suitable sensors could be used. For example, an inclination sensor could be attached to the tipper body 8 to measure the angular position of the tipper body. Further, a rotary position sensor could be used to measure the amount of rotation at either the pivot axis 10 of the tipper body 8, or the lower or upper pivot axes 30, 34 of the hydraulic cylinder 14. The signals generated by these sensors can all be related to the angular position of the tipper body (either with respect to the chassis 6 or horizontal). Further, a linear position sensor could be used to monitor the length of the hydraulic cylinder 14. Such a sensor could include a Hall effect sensor, for example. The signal generated by the linear position sensor could again be used to determine the angular position of the tipper body 8. In another arrangement, a distance sensor could be provided to measure the vertical distance between the frame and the lower front edge (i.e. the raised edge) of the tipper body 8. Such a sensor would generate an angular positional parameter as the output of the sensor relates to the angular position of the tipper body 8.

In other embodiments, a parameter other than an angular position parameter could be monitored to identify tipping cycles. For example, the hydraulic cylinder 14 could be provided with a pressure sensor arranged to generate an electronic pressure signal representative of the hydraulic pressure within the cylinder. The pressure signal could be monitored, and a tipping cycle could be identified each time there is a rise (such as a rise of a particular magnitude) in the pressure signal (corresponding to the movement of the tipper body 8 away from a resting position). Of course, other suitable parameters could also be monitored.

In one arrangement, the angular position of the tipper body is monitored to generate an angular positional parameter and the hydraulic pressure within the hydraulic cylinder is monitored to generate a pressure parameter. A tipping cycle may be identified only if the pressure parameter satisfies a first criteria, and the angular positional parameter satisfies a second criteria. For example, a tipping cycle may be identified if (i) the pressure parameter rises above a particular threshold, (ii) the angular positional parameter indicates that the tip angle has risen above a particular threshold (e.g. 25°), and (ii) the pressure parameter subsequently falls below a particular threshold. Of course, other conditions or criteria may be set.

Figure 7:
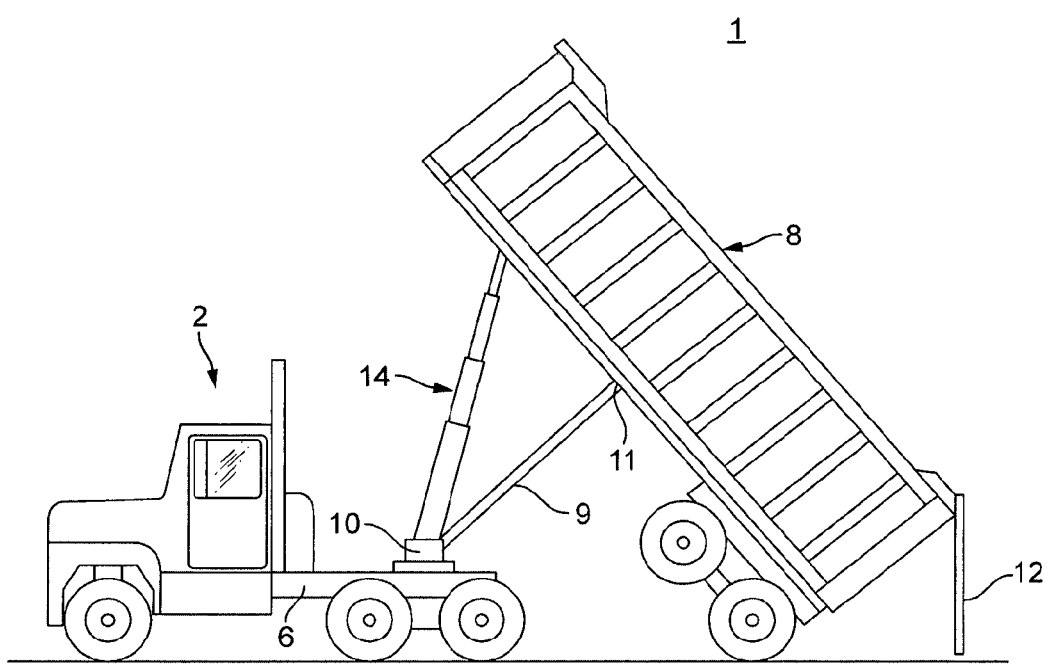
FIG. 7 schematically shows an alternative tipper truck.

It should be appreciated that the system could be used with any suitable type of tipper truck in which a tipper body 8 can be pivoted or moved by a hydraulic cylinder. For example, as shown in FIG. 7, the tipper truck 1 may comprises a tractor 2 having a frame 6 with a hydraulic cylinder 14 connected between the frame 6 and the tipper body 8. The tipper truck 14 further comprises a drawbar 11 that is pivotably connected at a first end to the frame 6 at a first pivot axis 10 and at a second end to the tipper body 8 at a second pivot axis 11. In order to pivot the tipper body 8 from a resting position (not shown) to the fully tipped position (FIG. 7), the hydraulic cylinder 14 is extended which causes the tipper body 8 to pivot clockwise (in FIG. 7) with respect to the frame 6 about the pivot axis 10, and with respect to the drawbar 9 about the pivot axis 11. It should also be appreciated that in order to measure the angular position (i.e. tip angle) of the tipper body 8 the inclination angle of the drawbar 9 could be measured since there is a fixed relationship between this angle and the tip angle (and the inclination angle of the hydraulic cylinder 14).

The service indicator system 40 may be one of many intelligent systems that the tipper truck 1 is provided with and could therefore be combined with any suitable system for providing information regarding the tipper vehicle and/or the load carried by the tipper body. If multiple intelligent systems are provided, they may share the same display or processors, for example.

Some aspects of the above-described apparatus, system and methods, may be embodied as machine readable instructions such as processor control code, for example on a non-volatile carrier medium such as a disk, CD- or DVD-ROM, programmed memory such as read only memory (Firmware), or on a data carrier such as an optical or electrical signal carrier. For some applications, embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). The code may be distributed between a plurality of coupled components in communication with one another. Where appropriate, embodiments may also be implemented using code running on a field-(re) programmable analogue array or similar device in order to configure analogue hardware.

For the avoidance of doubt, the present disclosure extends to the subject matter recited in the following numbered paragraphs or 'Paras':

1. A method of generating a service indicator for a tipper, the tipper comprising a tipper body pivotably moveable with respect to a frame with a hydraulic cylinder disposed therebetween and actuatable to pivot the tipper body to perform a tipping cycle, the method comprising:

monitoring at least one parameter relating to the movement of the tipper body with respect to the frame;

identifying when a tipping cycle is performed based on the at least one monitored parameter;

counting the number of tipping cycles performed;

determining whether the number of tipping cycles performed has reached a service threshold; and generating a service indicator when it is determined that the service threshold has been reached.

2. A method according to Para 1, wherein an angular positional parameter relating to the tip angle of the tipper body is monitored.

3. A method according to Para 2, wherein the angular positional parameter is generated by an inclination sensor.

4. A method according to Para 3, wherein the inclination sensor measures the inclination of the hydraulic cylinder.

5. A method according to Para 4, wherein the inclination sensor is mounted to the hydraulic cylinder.

6. A method according to Para 3, wherein the inclination sensor measures the inclination of the tipper body.

7. A method according to Para 6, wherein the inclination sensor is mounted to the tipper body.

8. A method according to Para 2, wherein the angular positional parameter is generated by a rotary position sensor.

9. A method according to Para 8, wherein the rotary position sensor measures the angular position of the hydraulic cylinder about a pivot axis of the hydraulic cylinder.

10. A method according to Para 8, wherein the rotary position sensor measures the angular position of the tipper body about the pivot axis of the hydraulic cylinder.

11. A method according to any preceding Para, wherein a pressure parameter relating to the hydraulic pressure within the hydraulic cylinder is monitored.

12. A method according to Para 11, wherein the pressure parameter is generated by a pressure sensor which measures the hydraulic pressure within the hydraulic cylinder.

13. A method according to Para 12, wherein the pressure sensor is mounted to the hydraulic cylinder.

14. A method according to any preceding Para, wherein a tipping cycle is identified when the monitored parameter crosses at least one threshold.

15. A method according to any preceding Para, wherein a tipping cycle is identified when the monitored parameter crosses at least an upper threshold and a lower threshold.

16. A method according to any preceding Para, wherein a tipping cycle counter is incremented each time a tipping cycle is identified.

17. A method according to any preceding Para, wherein determining whether the number of tipping cycles performed has reached a service threshold comprises comparing the number of tipping cycles performed with a service threshold number of cycles.

18. A method according to any preceding Para, wherein generating service indicator comprises generating a visual and/or an audible alert.

19. A method according to any preceding Para, further comprising displaying the number of tipping cycles counted.

20. A system for generating a service indicator for a tipper, the tipper comprising a tipper body pivotably moveable with respect to a frame with a hydraulic cylinder disposed therebetween and actuatable to pivot the tipper body to perform a tipping cycle, the system comprising:

a tipping cycle identification module arranged to:

monitor at least one parameter relating to the movement of the tipper body with respect to the frame; and identify when a tipping cycle is performed based on the at least one monitored parameter;

a tipping cycle counter arranged to count the number of tipping cycles performed;

a service determination module arranged to determine whether the number of tipping cycles performed has reached a service threshold; and a service indicator generator arranged to generate a service indicator when it is determined that the service threshold has been reached.

21. A system according to Para 20, wherein the tipping cycle identification module is arranged to monitor an angular positional parameter relating to the tip angle of the tipper body.

22. A system according to Para 21, further comprising an inclination sensor arranged to generate the angular positional parameter.

23. A system according to Para 22, wherein the inclination sensor is arranged to measure the inclination of the hydraulic cylinder.

24. A system according to Para 22, wherein the inclination sensor is arranged to measure the inclination of the tipper body.

25. A system according to Para 21, further comprising a rotary position sensor arranged to generate the angular positional parameter.

26. A system according to Para 25, wherein the rotary position sensor is arranged to measure the angular position of the hydraulic cylinder about a pivot axis of the hydraulic cylinder.

27. A system according to Para 25, wherein the rotary position sensor is arranged to measure the angular position of the tipper body about the pivot axis of the hydraulic cylinder.

28. A system according to any of Paras 20-27, wherein the tipping cycle identification module is arranged to monitor a pressure parameter relating to the hydraulic pressure within the hydraulic cylinder.

29. A system according to Para 28, further comprising a pressure sensor arranged to measure the hydraulic pressure within the hydraulic cylinder and generate the pressure parameter.

30. A system according to any of Paras 20-29, wherein the tipping cycle identification module is arranged to identify a tipping cycle when the monitored parameter crosses at least one threshold.

31. A system according to any of Paras 20-30, wherein the tipping cycle identification module is arranged to identify a tipping cycle when the monitored parameter crosses at least an upper threshold and a lower threshold.

32. A system according to any of Paras 20-31, wherein the tipping cycle counter is arranged to be incremented each time a tipping cycle is identified by the tipping cycle identification module.

33. A system according to any of Paras 20-32, further comprising a storage module storing a service threshold number of tipping cycles, and wherein the service determination module is arranged to determine whether the number of tipping cycles performed has reached a service threshold by comparing the number of tipping cycles performed with the service threshold number of cycles stored in the storage module.

34. A system according to any of Paras 20-33, wherein the service indicator generator comprises a visual and/or an audible alert generator.

35. A system according to any of Paras 20-34, further comprising a display arranged to display the number of tipping cycles counted.

36. A tipper comprising:
a tipper body pivotably moveable with respect to a frame;
a hydraulic cylinder disposed between the frame and the tipper body and actuatable to pivot the tipper body; and
a system in accordance with any of Paras 20-36.

37. A tipper according to Para 36 when appended to Para 23, wherein the inclination sensor is mounted to the hydraulic cylinder.

38. A tipper according to Para 36 when appended to Para 24, wherein the inclination sensor is mounted to the tipper body.

39. A tipper according to any of Paras 36-38 when appended to Para 29, wherein the pressure sensor is mounted to the hydraulic cylinder.

40. A tipper vehicle in accordance with any of Paras 36-39

41. A hydraulic cylinder assembly comprising:
a hydraulic cylinder having at least one pivot axis perpendicular to the longitudinal axis of the cylinder; and
at least one inclination sensor coupled to the hydraulic cylinder such that it is capable of generating a fore-aft inclination parameter relating to the inclination of the cylinder in a plane perpendicular to the pivot axis.

42. A hydraulic cylinder assembly according to Para 41, wherein at least one end of the hydraulic cylinder is provided with an eye which defines the pivot axis.

What is claimed is:

1. A method of generating a service indicator for a tipper, the tipper comprising a tipper body pivotably moveable with respect to a frame with a hydraulic cylinder disposed therebetween and actuatable to pivot the tipper body to perform a tipping cycle, the method comprising:
monitoring at least one parameter relating to the movement of the tipper body with respect to the frame;
monitoring an angular positional parameter relating to the tip angle of the tipper body;
identifying when a tipping cycle is performed based on the monitored parameters;
counting the number of tipping cycles performed;
determining whether the number of tipping cycles performed has reached a service threshold; and
generating a service indicator when it is determined that the service threshold has been reached.

2. The method according to claim 1, wherein the angular positional parameter is generated by an inclination sensor, optionally wherein the inclination sensor:
a) measures the inclination of the hydraulic cylinder, and is mounted to the hydraulic cylinder;
b) measures the inclination of the tipper body, and is mounted to the tipper body.

3. The method according to claim 1, wherein the angular positional parameter is generated by a rotary position sensor, optionally wherein the rotary position sensor measures:
a) the angular position of the hydraulic cylinder about a pivot axis of the hydraulic cylinder;
b) the angular position of the tipper body about the pivot axis of the hydraulic cylinder.

4. The method according to claim 1, wherein a pressure parameter relating to the hydraulic pressure within the hydraulic cylinder is monitored; optionally
wherein the pressure parameter is generated by a pressure sensor which measures the hydraulic pressure within the hydraulic cylinder, and optionally wherein the pressure sensor is mounted to the hydraulic cylinder.

5. The method according to claim 1, wherein a tipping cycle is identified when the monitored parameter crosses at least one threshold, optionally when the monitored parameter crosses at least an upper threshold and a lower threshold.

6. The method according to claim 1, wherein a tipping cycle counter is incremented each time a tipping cycle is identified.

7. The method according to claim 1, wherein determining whether the number of tipping cycles performed has reached a service threshold comprises comparing the number of tipping cycles performed with a service threshold number of cycles.

8. A system for generating a service indicator for a tipper, the tipper comprising a tipper body pivotably moveable with respect to a frame with a hydraulic cylinder disposed therebetween and actuatable to pivot the tipper body to perform a tipping cycle, the system comprising:
   a tipping cycle identification module arranged to:
      monitor at least one parameter relating to the movement of the tipper body with respect to the frame;
      monitor an angular positional parameter relating to the tip angle of the tipper body;
      identify when a tipping cycle is performed based on the monitored parameters; and
   a tipping cycle counter arranged to count the number of tipping cycles performed;
   a service determination module arranged to determine whether the number of tipping cycles performed has reached a service threshold; and
   a service indicator generator arranged to generate a service indicator when it is determined that the service threshold has been reached.

9. The system according to claim 8, further comprising an inclination sensor arranged to generate the angular positional parameter, optionally wherein the inclination sensor is:
   a) arranged to measure the inclination of the hydraulic cylinder;
   b) arranged to measure the inclination of the tipper body.

10. The system according to claim 8, further comprising a rotary position sensor arranged to generate the angular positional parameter, optionally wherein the rotary position sensor is arranged to measure:
   a) the angular position of the hydraulic cylinder about a pivot axis of the hydraulic cylinder;
   b) the angular position of the tipper body about the pivot axis of the hydraulic cylinder.

11. The system according to claim 8, wherein the tipping cycle identification module is arranged to monitor a pressure parameter relating to the hydraulic pressure within the hydraulic cylinder, optionally further comprising a pressure sensor arranged to measure the hydraulic pressure within the hydraulic cylinder and generate the pressure parameter.

12. The system according to claim 8, wherein the tipping cycle identification module is arranged to identify a tipping cycle when the monitored parameter crosses at least one threshold, optionally wherein the monitored parameter crosses at least an upper threshold and a lower threshold.

13. The system according to claim 8, wherein the tipping cycle counter is arranged to be incremented each time a tipping cycle is identified by the tipping cycle identification module.

14. The system according to claim 8, further comprising:
   a) a storage module storing a service threshold number of tipping cycles, and wherein the service determination module is arranged to determine whether the number of tipping cycles performed has reached a service threshold by comparing the number of tipping cycles performed with the service threshold number of cycles stored in the storage module; and/or
   b) a display arranged to display the number of tipping cycles counted.

15. A tipper comprising:
   a tipper body pivotably moveable with respect to a frame;
   a hydraulic cylinder disposed between the frame and the tipper body and actuatable to pivot the tipper body; and
   a system in accordance with claim 8.

16. The tipper according to claim 15, further comprising:
   a) an inclination sensor arranged to generate the angular positional parameter, wherein the inclination sensor is arranged to measure:
      i) the inclination of the hydraulic cylinder, optionally wherein the inclination sensor is mounted to the hydraulic cylinder; or
      ii) the inclination of the tipper body, optionally wherein the inclination sensor is mounted to the tipper body
   b) a pressure sensor arranged to measure the hydraulic pressure within the hydraulic cylinder and generate a pressure parameter, wherein the tipping cycle identification module is arranged to monitor the pressure parameter, optionally wherein the pressure sensor is mounted to the hydraulic cylinder.

* * * * *